Oct. 3, 1939.  A. DIAS  2,174,822
AUTOMOBILE WHEEL
Filed Nov. 23, 1938  2 Sheets-Sheet 1

Inventor
Anthony Dias

By Clarence A. O'Brien
and Hyman Berman
Attorneys

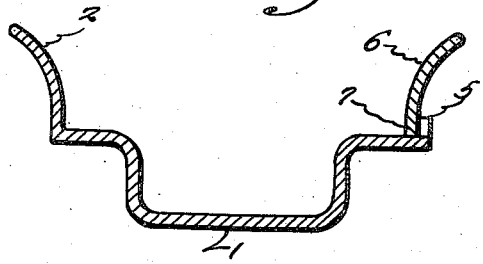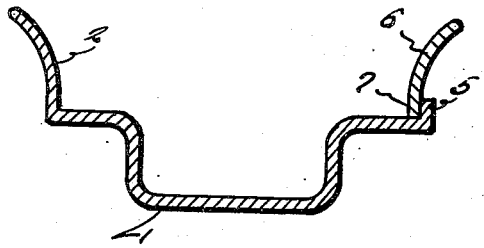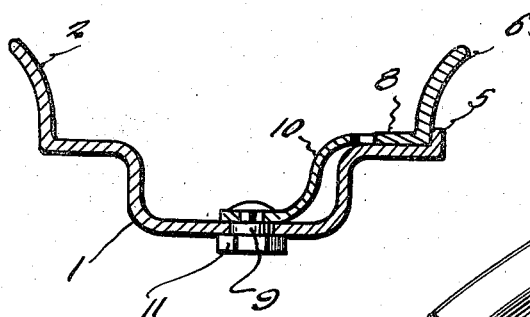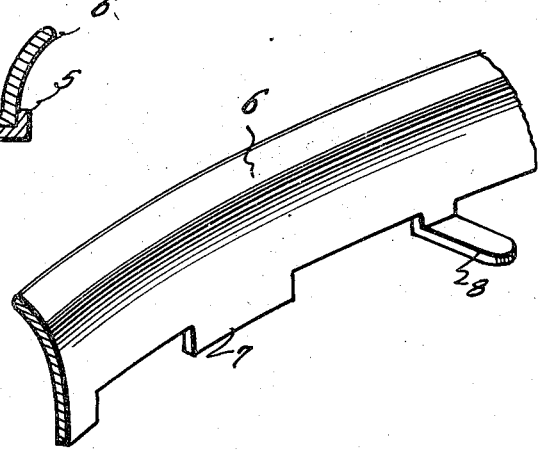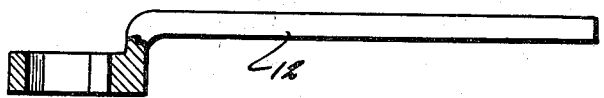

Patented Oct. 3, 1939

2,174,822

UNITED STATES PATENT OFFICE 2,174,822

AUTOMOBILE WHEEL

Anthony Dias, Hackensack, N. J., assignor to Dias Wheel & Turbine Corp., Hackensack, N. J., a corporation of New Jersey Application November 23, 1938, Serial No. 242,079

5 Claims. (Cl. 152—412)

The present invention relates to new and useful improvements in automobile wheels and has for its primary object to provide, in a manner as hereinafter set forth, a device of this character comprising a novel construction, combination and arrangement of parts through the medium of which a pneumatic tire may be expeditiously mounted thereon or removed therefrom.

Another very important object of the invention is to provide, in an automobile wheel of the type including a felly with a removable side ring or flange for retaining the tire, novel means for actuating said ring or flange and for locking same in position.

Other objects of the invention are to provide an automobile wheel of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 4 is a cross sectional view through the felly, showing the removable side flange thereon before it is rotated to locked position.

Figure 1:
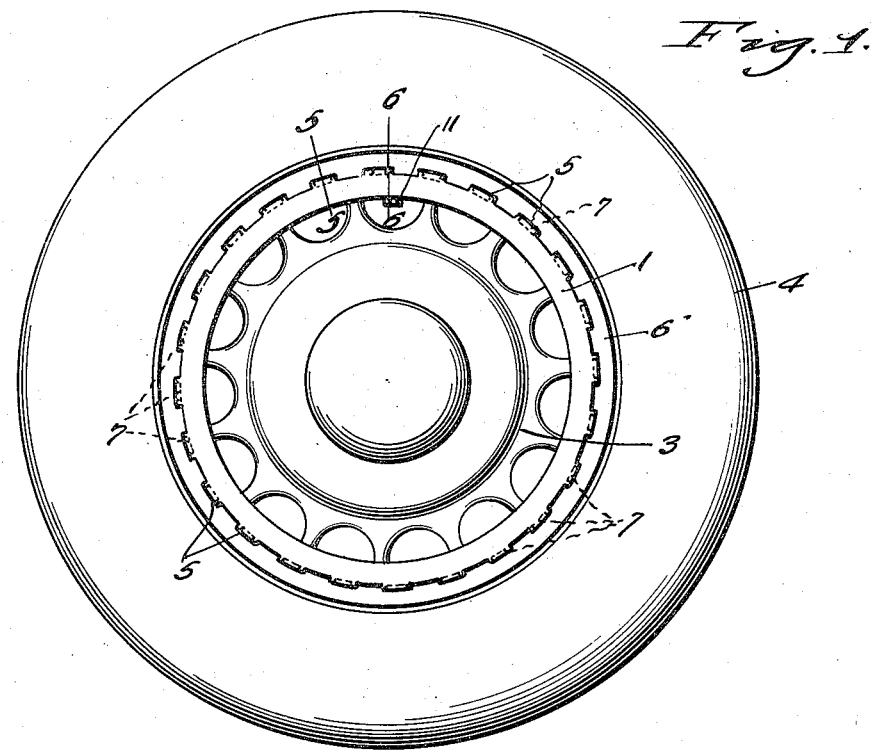
Figure 1 is a view in side elevation of a wheel constructed in accordance with the present invention, showing a pneumatic tire mounted thereon.
Figure 2:
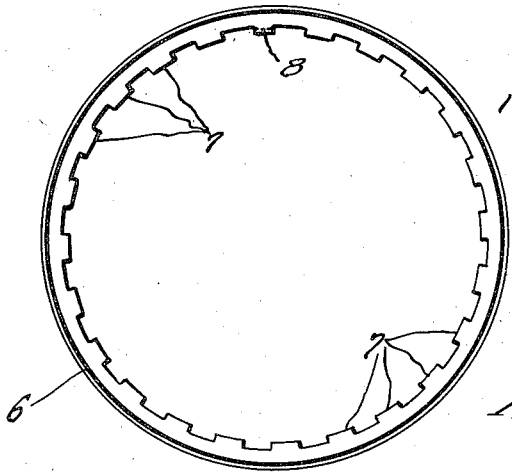
Figure 2 is a view in side elevation of the removable side ring or flange.

Figures 5 and 6 are cross sectional views, taken substantially on the lines 5—5 and 6—6, respectively, of Fig. 1.

Figure 7 is a perspective view of a portion of the removable side flange.

Figure 8 is a view in side elevation of the wrench for operating the locking mechanism, the head thereof being shown in section.

Referring now to the drawings in detail, it will be seen that the embodiment of the invention which has been illustrated comprises a felly 1 of suitable metal, said felly being of the drop center type. An integral flange 2 is provided on the inner side of the felly 1. The reference numeral 3 designates a conventional wheel on which the felly 1 is mounted. In Fig. 1 of the drawings, a pneumatic tire on the felly 1 is designated at 4.

Projecting radially from the outer edge of the felly 1 is a plurality of integral, circumferentially spaced lugs or flanges 5. The reference numeral 6 designates a removable tire retaining flange which is adapted to be mounted on the outer portion of the felly 1. Projecting from the inner periphery of the removable annular flange 6 is a plurality of circumferentially spaced flanges or lugs 7 which are adapted to pass between the lugs or flanges 5 of the felly 1. Projecting inwardly from the inner periphery of the removable flange 7 is a finger 8 the purpose of which will be presently set forth.

Referring now to Fig. 6 of the drawings, it will be seen that the reference numeral 9 designates what may be considered a short shaft journalled in an opening which is provided therefor in the drop center portion of the felly 1. Fixed on the outer end portion of the shaft 9 for actuation by said shaft is a fork 10 of substantially the shape shown to advantage in Figs. 3 and 6 of the drawings. On the inner end of the short shaft 9 is a hexagonal head 11.

Figure 3:
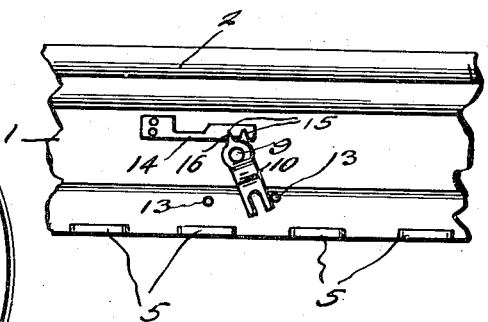
Figure 3 is a fragmentary view in top plan, showing the side flange operating and locking means.

The head 11 is adapted to receive a suitable operating tool in the form of a wrench 12 (see Fig. 8). Referring now to Fig. 3 of the drawings, it will be seen that the stops in the form of pins 13 are provided on the outer portion of the felly 1 for limiting the swinging movement of the fork 10 in opposite directions.

Also mounted in the drop center portion of the felly 1 is a circumferentially extending resilient latch 14. The resilient latch 14 has formed in its free end portion spaced notches 15 for the reception of a tooth or the like 16 which projects from the pivoted end of the fork 10 for releasably locking said fork in either of its two positions.

It is thought that the manner in which the wheel is used will be readily apparent from a consideration of the foregoing. After the pneumatic tire 4 has been mounted on the felly 1, the flange 6 is slipped on the outer portion of said felly by passing the lugs 7 between the lugs 5. This is shown in Fig. 4 of the drawings. When this is done care should be taken to position the flange 6 so that the finger 8 thereon enters the fork 10. To thus receive the finger 8, the fork 10 is in the position shown in Fig. 3 of the drawings. In Fig. 6 of the drawings, the finger 8 is shown engaged in the fork 10. The wrench 12 is now applied to the head 11 for rotating the shaft 9 in a manner to swing the fork 10 from right to left as seen in Fig. 3 of the drawings. In this manner the flange 6 is rotated for engaging the lugs 7 behind the lugs 5. The application of sufficient force to the shaft 9 will cause the tooth 16 to ride out of either of the notches 15 in the resilient latch 14 and snap into the other of said notches. It will thus be seen that the fork 10 in addition to providing means for rotating the removable flange 6, also constitutes means for locking said flange against rotation on the felly 1. Of course, to remove the flange 6 when it is desired to demount the pneumatic tire 4 the above described operation is substantially reversed.

It is believed that the many advantages of an automobile wheel constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. An automobile wheel comprising a felly, circumferentially spaced radial lugs on one side of said felly, a removable tire retaining flange adapted to be mounted on said one side of the felly and including spaced lugs on its inner periphery adapted to pass between the first named lugs, and means on the felly for rotating the flange thereon for engaging the second named lugs behind the first named lugs.

2. An automobile wheel comprising a felly including spaced lugs on one side, a tire retaining flange adapted to be removably mounted on said one side of the felly and including lugs engageable behind the first named lugs, a fork mounted for swinging movement on the felly, a finger on the flange engageable in said fork for operatively connecting the flange thereto, and means for actuating the fork for rotating the flange for engaging the second named lugs behind the first named lugs.

3. An automobile wheel comprising a felly including spaced lugs on one side, a shaft journalled in said felly, a fork fixed on said shaft, means on the shaft for receiving an operating tool for actuating the fork, a tire retaining flange adapted to be removably mounted on said one side of the felly, spaced lugs on said flange, and a finger on the flange engageable in the fork for connecting the flange to said fork for actuation thereby for engaging the lugs thereon behind the first named lugs.

4. An automobile wheel of the class described comprising a felly including a plurality of radial, circumferentially spaced lugs on one side, a removable tire retaining flange adapted to be mounted on said one side of the felly and including a plurality of spaced lugs on its inner periphery adapted to pass between the first named lugs, a shaft journalled in the felly, a head on one end of the shaft for receiving an operating tool, a fork fixed on the other end portion of the shaft, stops on the felly for limiting the swinging movement of the fork in opposite directions, a finger on the flange engageable in the fork for connecting said flange to said fork for rotation thereby for engaging the second named lugs behind the first named lugs, and means for releasably locking the fork against swinging movement.

5. An automobile wheel of the class described comprising a felly including a plurality of radial, circumferentially spaced lugs on one side, a removable tire retaining flange adapted to be mounted on said one side of the felly and including a plurality of spaced lugs on its inner periphery adapted to pass between the first named lugs, a shaft journalled in the felly, a head on one end of the shaft for receiving an operating tool, a fork fixed on the other end portion of the shaft, stops on the felly for limiting the swinging movement of the fork in opposite directions, a finger on the flange engageable in the fork for connecting said flange to said fork for rotation thereby for engaging the second named lugs behind the first named lugs, and means for releasably locking the fork against swinging movement, said means including a resilient latch mounted circumferentially on the felly and having one end portion secured thereto, the other end of said resilient latch being free, the free end portion of the resilient latch having spaced notches therein, and a tooth projecting from the pivoted end of the fork and engageable in the notches.

ANTHONY DIAS.